(12) United States Patent
Rago

(10) Patent No.: US 8,181,443 B2
(45) Date of Patent: May 22, 2012

(54) HEAT EXCHANGER TO COOL TURBINE AIR COOLING FLOW

(75) Inventor: Guiseppe Rago, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 747 days.

(21) Appl. No.: 12/331,605

(22) Filed: Dec. 10, 2008

(65) Prior Publication Data

US 2010/0139288 A1    Jun. 10, 2010

(51) Int. Cl.
*F02K 3/02*    (2006.01)

(52) U.S. Cl. .......... 60/226.1; 60/226.3; 60/266; 60/782; 415/116; 415/117; 415/175

(58) Field of Classification Search .......... 60/39.83, 60/226.1, 226.3, 266, 782, 785, 806; 415/116, 415/117, 173.1, 173.2, 175, 176, 178
See application file for complete search history.

(56) References Cited

U.S. PATENT DOCUMENTS

| | | | |
|---|---|---|---|
| 2,474,258 A | 6/1949 | Kroon | |
| 2,696,712 A | 12/1954 | Lewis | |
| 3,386,243 A | 6/1968 | Beam, Jr. et al. | |
| 3,475,906 A | 11/1969 | Madelung | |
| 3,528,250 A | 9/1970 | Johnson | |
| 3,584,458 A | 6/1971 | Wetzler | |
| 3,797,561 A | 3/1974 | Clark et al. | |
| 3,842,597 A | 10/1974 | Ehrich | |
| 3,966,354 A * | 6/1976 | Patterson | 415/116 |
| 4,151,710 A | 5/1979 | Griffin et al. | |
| 4,187,675 A | 2/1980 | Wakeman | |
| 4,254,618 A | 3/1981 | Elovic | |
| 4,903,760 A | 2/1990 | Joshi et al. | |
| 4,914,904 A | 4/1990 | Parnes et al. | |
| 5,048,288 A * | 9/1991 | Bessette et al. | 60/226.1 |
| 5,212,940 A * | 5/1993 | Glover | 60/782 |
| 5,268,135 A | 12/1993 | Sasaki et al. | |
| 5,269,133 A | 12/1993 | Wallace | |
| 5,269,135 A | 12/1993 | Vermejan et al. | |
| 5,284,012 A | 2/1994 | Laborie et al. | |
| 5,297,386 A | 3/1994 | Kervistin | |
| 5,351,473 A | 10/1994 | Shuba | |
| 5,351,476 A | 10/1994 | Laborie et al. | |
| 5,392,614 A | 2/1995 | Coffinberry | |
| 5,581,996 A | 12/1996 | Koch et al. | |
| 5,782,077 A | 7/1998 | Porte | |
| 5,806,793 A | 9/1998 | Brossier et al. | |
| 5,823,250 A | 10/1998 | Barten et al. | |
| 5,860,471 A | 1/1999 | Perryment et al. | |
| 6,092,360 A | 7/2000 | Hoag et al. | |
| 6,134,880 A | 10/2000 | Yoshinaka | |
| 6,625,989 B2 | 9/2003 | Boeck | |
| 6,651,929 B2 | 11/2003 | Dionne | |
| 6,662,546 B1 * | 12/2003 | Giffin, III | 60/39.5 |
| 7,013,636 B2 | 3/2006 | Lya et al. | |
| 7,254,937 B2 | 8/2007 | Hull et al. | |
| 7,334,411 B2 | 2/2008 | Vandermolen | |
| 7,377,100 B2 | 5/2008 | Bruno et al. | |
| 2003/0127218 A1 | 7/2003 | Sears et al. | |

* cited by examiner

*Primary Examiner* — Ehud Gartenberg
*Assistant Examiner* — Michael B Mantyla
(74) *Attorney, Agent, or Firm* — Norton Rose Canada LLP

(57) ABSTRACT

A cooling system of a gas turbine engine, includes a heat exchanger having a common wall shared by a first air passage for directing a portion of a compressor air flow to be used as cooling air, and a second air passage for directing a portion of a bypass air flow, the portion of the compressor air flow being thereby cooled by the portion of the bypass air flow through the common wall.

15 Claims, 3 Drawing Sheets

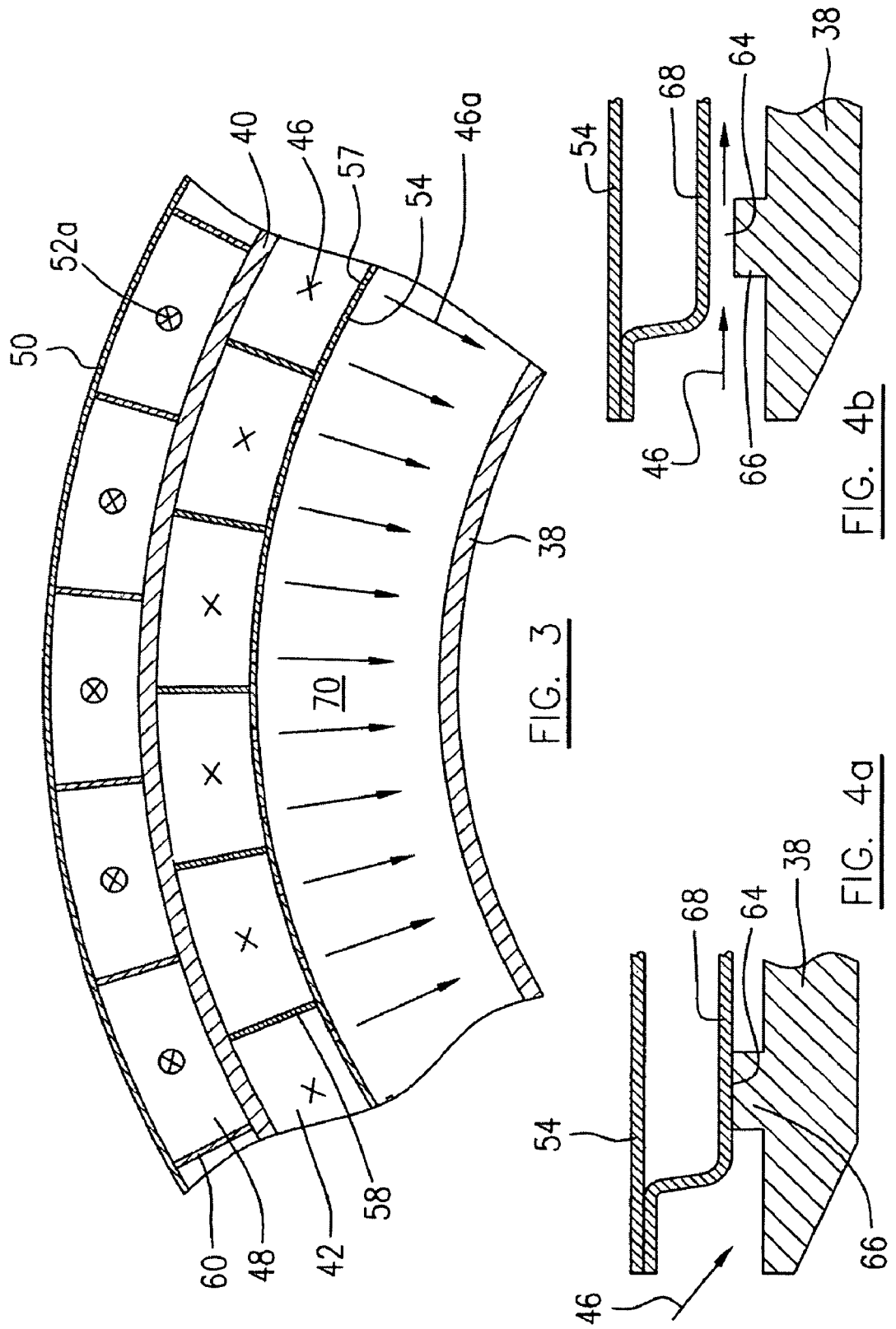

HEAT EXCHANGER TO COOL TURBINE AIR COOLING FLOW

TECHNICAL FIELD

The application relates generally to a gas turbine engine and more particularly, to a cooling system for gas turbine engines.

BACKGROUND OF THE ART

"Active tip clearance control" refers to a gas turbine engine system wherein the radial gap between the turbine blades and surrounding static shroud is varied during the engine cycle in order to optimize tip clearance. Active tip clearance control (ATCC) typically uses compressor or bypass air to selectively cool the turbine shrouds to affect tip clearance. The compressor outlet air (sometimes referred to as "P3" air) usually has a relatively high temperature and a large volume of compressor air is thus required to achieve an effective cooling of the turbine shroud, which is therefore relatively thermodynamically "expensive" for the engine. The use of bypass air for ATCC may be preferred because of its relatively lower temperature, however, bypass air is at a much lower pressure than P3 air, making it more sensitive to pressure losses within the ATCC system. These and other problems indicate the need to provide improved ATCC systems.

SUMMARY

In one aspect, provided is a gas turbine engine comprising a gas path having a core flow portion and a bypass flow portion, the core flow portion including at least a compressor, combustor and turbine, the compressor providing compressor air and the bypass flow portion conducting bypass air; a first air passage in fluid communication with the compressor air for directing a portion of the compressor air to cool a turbine system, the portion of compressor air passing through a heat exchanger; a second air passage in fluid communication with the bypass air for directing a portion of the bypass air to the heat exchanger to cool the portion of compressor air passing through the heat exchanger; and wherein the heat exchanger includes a common wall extending between and shared by the first and second air passages, the common wall configured for transferring heat from the portion of the compressor air flowing in the first air passage to the portion of the bypass air flowing in the second air passage, thereby cooling the portion of the compressor air.

In another aspect, provided is a gas turbine engine having a fan assembly, a compressor assembly, a combustion gas generator assembly, a turbine assembly and a bypass duct, the engine further comprising an active tip clearance control (ATCC) system using a portion of a compressor air flow as cooling air of the ATCC directed along a turbine case which surrounds the turbine assembly and is cooled by a portion of a bypass air flow introduced from the bypass duct, and wherein at least one portion of the turbine case forms a common wall shared by a first air passage for directing the portion of the compressor air flow and a second air passage for directing the portion of the bypass air flow.

In a further aspect, there is provided a method for active tip clearance control (ATCC) of a turbine, the method comprising the steps of: a) directing a portion of a bypass air flow to cool a portion of a compressor air flow; b) directing the cooled portion of the compressor air flow to cool a surface of an active tip clearance control (ATCC) apparatus; and c) adjusting a temperature of the surface of ATCC apparatus by selectively introducing an uncooled portion of the compressor air flow into the cooled portion of the compressor air flow to increase a temperature of air provided to the ATCC apparatus.

Further details of these and other aspects will be apparent from the detailed description and figures included below.

DESCRIPTION OF THE DRAWINGS

Reference is now made to the accompanying figures, in which:

FIG. 3 is a partial cross-sectional view of the gas turbine engine taken along line 3-3 in FIG. 2, showing a cooling apparatus of this embodiment;

FIG. 4a is an enlarged scale of the circled area indicated by letter "T:" in FIG. 2, showing means for selectively adding an uncooled portion of the compressor air flow into the cooled portion of the compressor air flow for adjustment of the temperature of the turbine shroud casing in ATCC and the means illustrated in a closed position; and FIG. 4b is an enlarged scale of the circled area indicated by letter "T:" in FIG. 2, showing means for selectively adding an uncooled portion of the compressor air flow into the cooled portion of the compressor air flow for adjustment of the temperature of the turbine shroud casing in ATCC and the means illustrated in an open position to allow an uncooled portion of the compressor air flow to pass through.

DETAILED DESCRIPTION OF THE PREFERRED EMBODIMENTS

Figure 1:
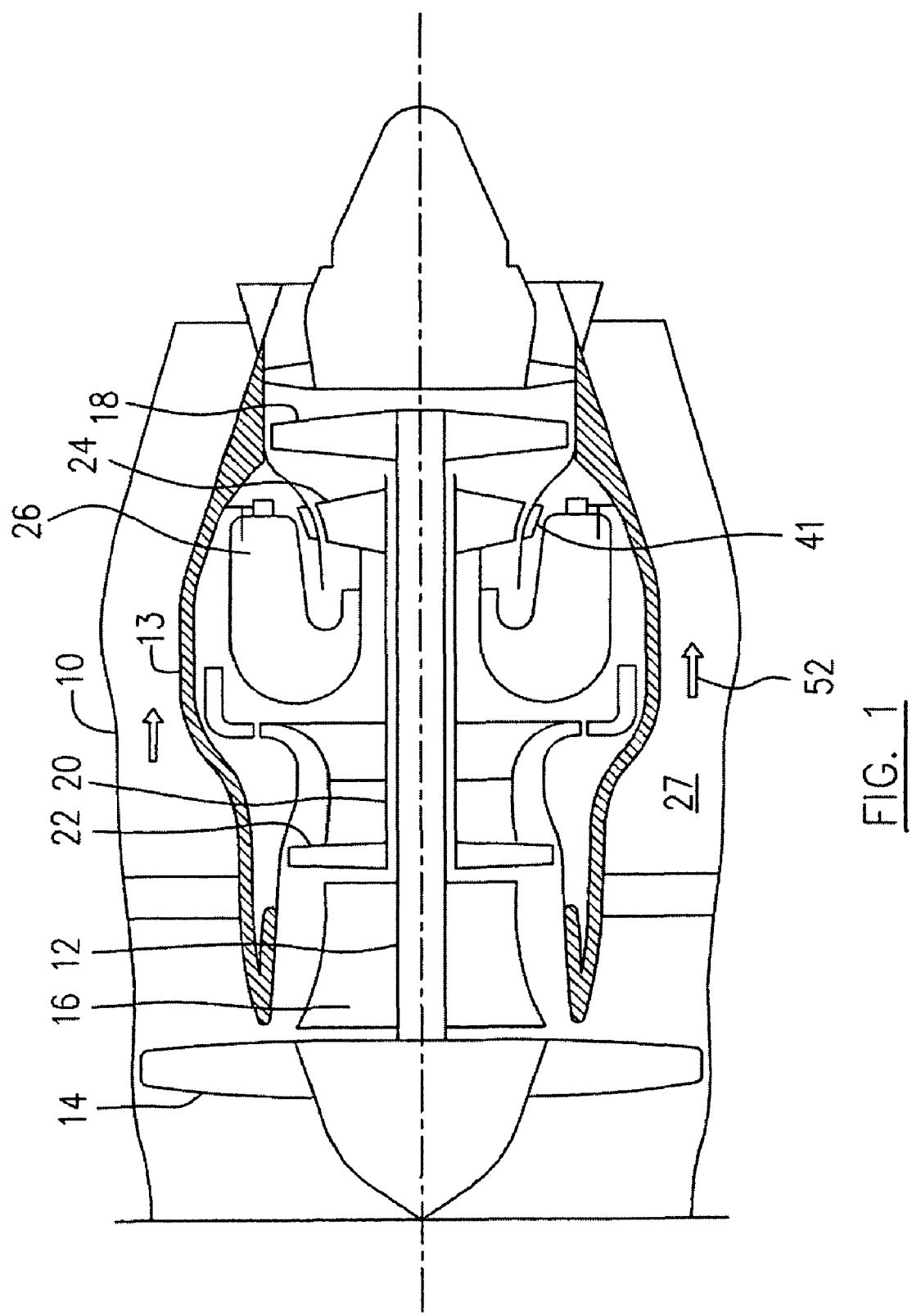
FIG. 1 is a schematic cross-sectional view of a bypass gas turbine engine including the described concept.

Referring to FIG. 1, a bypass gas turbine engine includes a housing or nacelle 10, a core casing 13, a low pressure spool assembly (not numbered) which includes a fan assembly 14, a low pressure compressor assembly 16 and a low pressure turbine assembly 18 connected by a shaft 12, a high pressure spool assembly (not numbered) which includes a high pressure compressor assembly 22 and a high pressure turbine assembly 24 connected by a turbine shaft 20. The core casing 13 surrounds the low and high pressure spool assemblies to define a main flow path therethrough. In the main flow path there is provided a combustion gas generator assembly 26 to generate combustion gases for powering the high and low pressure turbine assemblies 24, 18. The housing 10 and the core casing 13 in combination, define an annular bypass air duct 27 to direct a bypass air flow 52 driven by the fan assembly 14 to pass therethrough.

The terms "axial" and "radial" used for various components below are defined with respect to the main engine axis shown but not numbered in FIG. 1.

Figure 2:
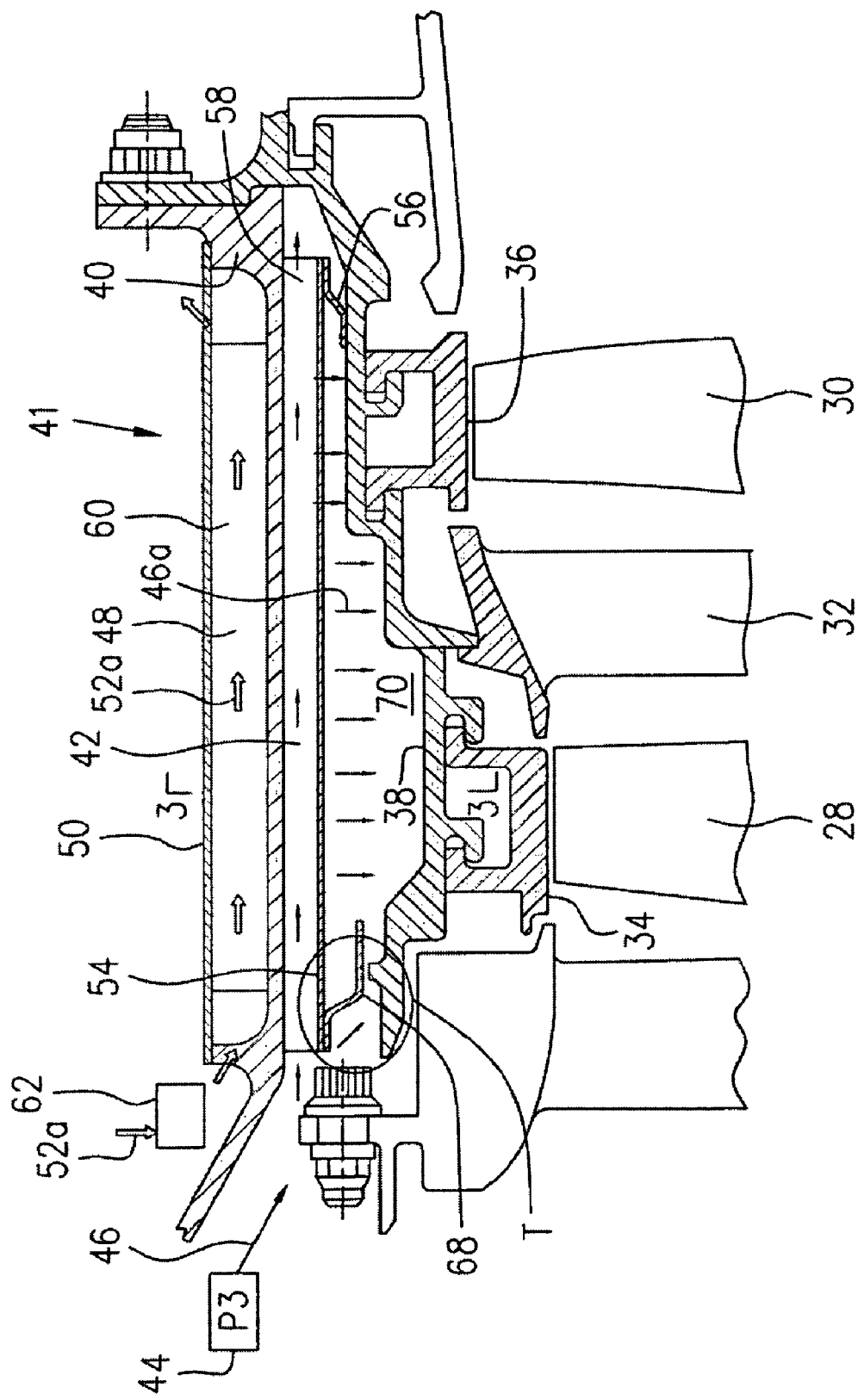
FIG. 2 is a partial cross-sectional view of the bypass gas turbine engine of FIG. 1 in an enlarged scale to show a cooling system of the engine according to one embodiment.

Referring to FIGS. 1-4, a turbine assembly, for example the high pressure turbine assembly 24, generally includes a turbine rotor having a plurality of radially extending blades rotatably surrounded by a stationary turbine shroud. The turbine rotor may be a single stage type which includes only one row of blades or a multiple stage type which includes more than one row of blades. FIG. 2 shows in this embodiment, a two stage turbine assembly including a first row of blades 28 (only one blade shown) and a second row of blades 30 (only one blade shown) which is positioned downstream of and axially spaced from the first row of blades 28. The blades 28 and 30 may be driven by a single shaft such as shaft 12. A row of radially extending stator vanes 32 is positioned axially between the rows of blades 28 and 30. The blades 28 and 30 are rotated within respective turbine shrouds 34, 36 which encircle the respective blades 28 and 30 with a small clearance between the tips of the blades 28, 30 and the respective turbine shrouds 34, 36. This clearance is usually referred to as a "tip clearance". An annular turbine shroud casing 38 is provided to support and position the respective turbine shrouds 34, 36. The turbine shroud casing 38 is in turn, supported within an annular turbine case 40. The predetermined tip clearance is critical to engine performance. A large tip clearance will cause combustion gas leakage over the tips of the blades and those "leaked" gases which do not contribute to powering the turbines are wasted. Therefore, a small tip clearance is generally preferred. Nevertheless, the radial dimensions of the respective turbine shrouds 34, 36 are substantially affected by varying thermal expansions during the entire engine operation cycle in which the temperatures of the respective turbine shrouds 34, 36 and turbine shroud casing 40 change dramatically. Therefore, an active tip clearance cooling (ATCC) system 41 is provided to selectively cool the annular turbine shroud casing 38 and the respective turbine shrouds 34, 36 in order to control the radial dimensions of the respective turbine shrouds 34, 36 and thus the tip clearance.

In this embodiment the cooling system includes a first air passage 42 in fluid communication with a source of compressor air indicated by numeral 44 such as P3 air bled from the high pressure compressor assembly 22, for directing a portion of a compressor air flow 46 to cool the turbine shroud casing 40 for ATCC. A second air passage 48 is provided in fluid communication with the bypass air duct 27 for directing a portion 52a of the bypass air flow 52 to cool at least a portion of the turbine case 40.

In particular, the second air passage 48 is defined radially between a portion of the turbine case 40 and an annular outer wall 50 which surrounds and is supported by the turbine case 40. The second air passage 48 has an inlet and an outlet (not shown) to allow the portion 52a of the bypass air flow 52 to be diverted to pass therethrough. The first air passage is defined radially between that portion of the turbine case 40 which also defines the second air passage 48, and an annular inner wall 54 which may be made of a sheet metal, positioned radially inwardly spaced apart from and supported by said portion of the turbine case 40. The first air passage 42 may have an open upstream end (not numbered) to form an inlet for in-taking of a portion of the compressor air flow 46, and a downstream end (not numbered) which is closed for example by an annular plate 56 of sheet metal. The portion of the compressor air flow 46 entering the first air passage 42 is discharged under pressure through a plurality of holes 57 (see FIG. 3) as air streams (indicated by arrows 46a) which impinge on the turbine shroud casing 38.

The portion of the turbine case 40 which in combination with the respective inner and outer walls 54, 50, defines the respective first and second air passages 42, 48, forms a common wall shared by the first and second air passages, thereby transferring heat from the compressor air flow 46 which passes through the first air passage 42 (and has a relatively high temperature), to the portion 52a of the bypass air flow 52 which passes through the second air passage 48 (and has a relatively lower temperature). The portion 52a of the bypass air flow 52 which passes through the second air passage 48 is then exhausted to a suitable location, such as back to the bypass duct, or the gas path, etc., and may further be used for other purposes (e.g. further cooling of a downstream structure) before it reaches such destination.

The common wall formed by the portion of the turbine case 40 acts as a turbine case/surface cooler using the portion 52a of the bypass air flow 52 to cool a portion of the compressor air flow 46 such that the impingement streams indicated by arrows 46a come from the cooled portion of the compressor air flow 46 which has a much lower temperature relative to the uncooled compressor air flow 46. The cooling result of the turbine shroud casing 38 may thus be more efficient, for example, than uncooled prior art. Other benefits may also be available. Therefore, the total volume of compressor air to be used for ATCC may be reduced, which may benefit engine performance.

It may be desirable to provide a plurality of radially extending fins 58 affixed to an inner side of the portion of the turbine case 40 (the common wall). Optionally, the radially extending fins 58 may extend across the entire radial dimension of the first air passage 42, dividing the annular first air passage 42 into a number of circumferential segments, as shown in FIG. 3. Similarly, a plurality of radially extending fins 60 may be provided within the second air passage 48, being affixed to an outer side of the portion of the turbine case 40 (the common wall). Optionally, the radially extending fins 60 may extend across the entire radial dimension of the annular second air passage 48, thereby dividing the second air passage 48 into a number of circumferential segments, as shown in FIG. 3. The fins 58, 60 increase the area of contact surface coming into contact with the respective portion of compressor air flow 46 and portion 52a of bypass air flow 52. Therefore, not only the portion of the turbine case 40 (common wall), but also the fins 58, 60 should function as a heat exchange medium between the portion of compressor air flow 46 and the portion 52a of bypass air flow 52, resulting in more efficient heat exchange.

It should be noted that a plurality of fins having smaller axial dimensions may be positioned along the axial direction to replace each of the fins 58 or 60 which has a relatively long axial dimension as illustrated in FIG. 2.

The temperature of the cooled compressor air flow forming the impingement streams 46a may be controlled for example by regulating the air flow rate and thus the volume of the portion 52a of bypass air flow 52, for example by using a flow rate regulator 62 including various types of valves. Such flow rate regulators are well known to those of ordinary skill in the art and will not be described in detail herein.

Optionally, means may be provided for selectively adding an uncooled portion of the compressor air flow 46 into the impingement air streams 46a which are the cooled portion of the compressor air flow 46, in response to temperature change of the turbine shroud casing 38, in order to prevent the turbine shroud casing 38 from becoming over-cooled which may cause an undesirable zero tip clearance problem.

In this embodiment, an annular inlet 64 is provided between an axial section 66 (see FIGS. 4a-4b) of the turbine shroud casing 38 and an axial section 68 of the annular inner wall 54, which for example may be made in a ring configuration attached to the inner side of the inner wall 54 at the upstream end thereof. The annular inlet 64 is in fluid communication with an annulus 70 (See FIG. 2) defined between the annular inner wall 54 and the turbine shroud casing 38 for receiving the impingement air streams 46a. The radial dimension of the turbine shroud casing 38 varies in response to temperature changes thereof. The inner wall 54 and the axial section 68 may also change in a radial dimension due to temperature changes thereof. However, the turbine shroud casing 38 with the respective turbine shrouds 34, 36 attached therein is more directly affected by both the hot gases passing through the turbine assembly and the cooled impingement air streams 46a. The temperature changes of the turbine shroud casing 38 are therefore relatively dramatic compared to the temperature changes of the inner wall 54. For the above reasons, the radial dimension of the annular inlet 64 (the annular gap between the axial sections 66 and 68) varies substantially depending on temperature changes of the turbine shroud casing 38. When the tip clearance is too large due to high temperatures of the turbine shroud casing 38 (and the turbine shroud 34, 36), the turbine shroud 38 increases its radial dimension and thus reduces the radial dimension of the annular inlet 64 (the annular gap between the axial sections 64, 68), thereby reducing the flow rate and thus the volume of the uncooled portion of the compressor air flow 46 passing through the inlet 64 and entering the annulus 70. In an extreme case, the annular inlet 64 may be completely closed as shown in FIG. 4a such that no uncooled portion of the compressor air flow 46 can be introduced into the annulus 70.

With no or a reduced uncooled portion of the compressor air flow 46 added into the annulus 70, the temperature of the impingement air streams 46a is unaffected or is less affected by the relative high temperatures of the compressor air flow 46 which is not cooled by the bypass air flow 52. Therefore, the relatively low temperature of the impingement air streams 46a, cool the turbine shroud casing 38 more efficiently, resulting in quick cooling of the turbine shroud casing 38. When the tip clearance reduces due to the cooling result on the turbine shroud casing 38, the radial dimension of the turbine shroud casing 38 reduces and the annular inlet 64 (the annular gap between the axial sections 66 and 68) is re-opened and/or increases to allow an uncooled portion and/or to increase the uncooled portion of the compressor air flow 46, to enter the annulus 70, thereby increasing the temperature of the impingement air streams 46a which are cooled when passing through the first air passages 42, by the portion of the bypass air flow 52 passing through the second air passage 48. The cooling efficiency of the turbine shroud casing 38 is thereby reduced and the temperature and the radial size of the turbine shroud casing 38 with the respective shrouds 34, 36 will increase. Therefore, the annular inlet 64 performs as a means for automatically regulating ATCC in response to temperature changes of the turbine shroud casing 38.

The above description is meant to be exemplary only, and one skilled in the art will recognize that changes may be made to the embodiments described without departure from the scope of the concept described. For example, the turbine assembly as an application of an ATCC system in the above-described embodiment, has two turbine stages, however turbine assemblies of other types having a stationary shroud or shroud casing, may be applicable for this concept. Any suitable ATCC configuration may be employed, and is not limited to the example described. This concept can also be used for cooling systems of a gas turbine engine other than an ATCC system. Still other modifications which fall within the scope of the described concept will be apparent to those skilled in the art, in light of a review of this disclosure, and such modifications are intended to fall within the appended claims.

What is claimed is:

1. A gas turbine engine comprising:
   a gas path having a core flow portion and a bypass flow portion, the core flow portion including at least a compressor, combustor and turbine, the compressor providing compressor air and the bypass flow portion conducting bypass air;
   a heat exchanger incorporated with at least one portion of turbine case surrounding the turbine, the heat exchanger having first and second air passages, the at least one portion of the turbine case forming a common wall separating and shared by the first and second air passages; and
   the first air passage in fluid communication with the compressor air for directing a portion of the compressor air through the heat exchanger to cool a turbine system, the second air passage in fluid communication with the bypass air for directing a portion of the bypass air through the heat exchanger to cool the portion of compressor air passing through the heat exchanger, the common wall in the heat exchanger configured to transfer heat from the portion of the compressor air flowing in the first air passage to the portion of the bypass air flowing in the second air passage, to cool the portion of the compressor air, the first air passage being defined between the common wall formed by the at least one portion of the turbine case and an annular inner wall positioned radially, inwardly spaced apart from and supported by the turbine case, the annular inner wall surrounding a turbine shroud casing and including a plurality of holes extending radially through the annular inner wall for directing the cooled portion for the compressor air to impinge on the turbine shroud casing;
   an apparatus configured for selectively adding an uncooled portion of the compressor air into the cooled portion of the compressor air after being discharged through the holes in the inner wall, in response to a temperature change of the turbine shroud casing of the turbine system, wherein the apparatus comprises an annular inlet introducing the uncooled portion of the compressor air into an annulus defined between the annular inner wall and the turbine shroud casing for receiving the cooled portion of the compressor air discharged from the holes in the inner wall, the inlet being defined between an axial section of the annular inner wall and an axial section of the turbine shroud casing, the inlet thereby changing an opening size when the axial section of the turbine shroud casing changes a size in a radial dimension in response to temperature changes of the turbine shroud casing.

2. The gas turbine engine as defined in claim 1 wherein the first air passage communicates with an active tip clearance control (ATCC) system downstream of the heat exchanger.

3. The gas turbine engine as defined in claim 1 further comprising a plurality of fins radially inwardly extending from an inner side of the common wall into the first air passage.

4. The gas turbine engine as defined in claim 1 wherein the second air passage is defined between the common wall formed by the at least one portion of the turbine case and an annular outer wall surrounding and radially spaced apart from the turbine case.

5. The gas turbine engine as defined in claim 1 further comprising a plurality of fins radially outwardly extending from an outer side of the common wall into the second passage.

6. The gas turbine engine as defined in claim 1 further comprising a plurality of fins radially outwardly extending from an outer side of the common wall into the second passage.

7. The gas turbine engine as defined in claim 1 further comprising means for regulating the portion of the bypass air passing through the heat exchanger, thereby controlling heat transfer between the first and second air passages and thereby controlling a temperature of the cooled portion of the compressor air.

8. A gas turbine engine having a fan assembly, a compressor assembly, a combustion gas generator assembly, a turbine assembly and a bypass duct, the engine further comprising a heat exchanger for an active tip clearance control (ATCC) system using a portion of a compressor air flow as cooling air of the ATCC, the heat exchanger including at least one portion of a turbine case which surrounds the turbine assembly, the at least one portion of the turbine case forming a common wall shared by and separating in the heat exchanger, a first air passage for directing a portion of the compressor air flow and a second air passage for directing a portion of the bypass air flow introduced from the bypass duct to thereby cool the portion of the compressor air flow; wherein the first air passage is defined between the common wall formed by the at least one portion of the turbine case and an annular inner wall positioned radially, inwardly spaced apart from and supported by the turbine case; wherein the annular inner wall surrounds a turbine shroud casing and comprises a plurality of holes extending radially through the annular inner wall for directing the cooled portion of the compressor air to impinge on the turbine shroud casing; and wherein an apparatus is configured for selectively adding an uncooled portion of the compressor air into the cooled portion of the compressor air after being discharged through the holes in the inner wall, in response to a temperature change of the turbine shroud casing of the turbine system, the apparatus is including an annular inlet introducing the uncooled portion of the compressor air into an annulus defined between the annular inner wall and the turbine shroud casing for receiving the cooled portion of the compressor air discharged from the holes in the inner wall, the inlet being defined between an axial section of the annular inner wall and an axial section of the turbine shroud casing, the inlet thereby changing an opening size when the axial section of the turbine shroud casing changes a size in a radial dimension in response to temperature changes of the turbine shroud casing.

9. The gas turbine engine as defined in claim 8 wherein the shared common wall formed by the at least one portion of the turbine case comprises a first group of fins affixed to an inner side of the common wall and extending into the first air passage and a second group of fins affixed to an outer side of the common wall and extending into the second air passage.

10. The gas turbine engine as defined in claim 8 wherein the ATCC system further comprises a regulator for controlling the portion of the bypass air flow passing through the heat exchanger, thereby controlling a temperature of the cooled portion of the compressor air flow in the first air passage.

11. The gas turbine engine as defined in claim 8 wherein the apparatus further comprises an inlet for selectively introducing a varying portion of an uncooled compressor air flow into an annulus in response to temperature changes of a turbine shroud casing, the annulus surrounding the turbine shroud casing and receiving a cooled portion of the compressor air flow discharged from the first air passage.

12. A method for active tip clearance control (ATCC) of a turbine, the method comprising the steps of:
 a) directing a portion of a bypass air flow to cool a portion of a compressor air flow;
 b) directing the cooled portion of the compressor air flow to cool a surface of an active tip clearance control (ATCC) apparatus; and
 c) adjusting a temperature of the surface of ATCC apparatus by selectively introducing an uncooled portion of the compressor air flow into the cooled portion of the compressor air flow to increase a temperature of air provided to the ATCC apparatus, wherein the uncooled portion of the compressor air flow is introduced through an annular inlet into an annulus defined between an annular inner wall and a turbine shroud casing for receiving the cooled portion of the compressor air discharged from holes in the inner wall, the inlet being defined between an axial section of the annular inner wall and an axial section of the turbine shroud casing, the inlet thereby changing an opening size when the axial section of the turbine shroud casing changes a size in a radial dimension in response to temperature changes of the turbine shroud casing.

13. The method as defined in claim 12 wherein the portion of the bypass air flow used to cool the portion of the compressor air flow, is regulated to control a temperature of the cooled portion of the compressor air flow.

14. The method as defined in claim 12 wherein step (a) is conducted through a heat exchanger having first and second air passages sharing a common wall defined by at least one portion of a turbine case, the first air passage directing the portion of the compressor air flow and the second air passage directing the portion of the bypass air flow.

15. The method as defined in claim 12 wherein the selective introduction of the uncooled portion of the compressor air flow is automatically conducted in response to temperature changes of the surface of the ATCC apparatus.

* * * * *